United States Patent
Pragada et al.

(10) Patent No.: US 7,574,595 B2
(45) Date of Patent: Aug. 11, 2009

(54) TRANSPARENT SESSION INITIATED PROTOCOL

(75) Inventors: Ravikumar Pragada, Collegeville, PA (US); John Thommana, Austin, TX (US)

(73) Assignee: InterDigital Technology Corporation, Wilmington, DE (US)

( * ) Notice: Subject to any disclaimer, the term of this patent is extended or adjusted under 35 U.S.C. 154(b) by 921 days.

(21) Appl. No.: 10/900,941

(22) Filed: Jul. 28, 2004

(65) Prior Publication Data

US 2005/0283832 A1    Dec. 22, 2005

Related U.S. Application Data

(60) Provisional application No. 60/582,035, filed on Jun. 22, 2004.

(51) Int. Cl.
*G06F 21/00* (2006.01)
*H04L 29/06* (2006.01)

(52) U.S. Cl. .................. 713/153; 726/12; 709/229
(58) Field of Classification Search .......... 726/12; 713/153; 370/341, 335, 338; 709/227, 229
See application file for complete search history.

(56) References Cited

U.S. PATENT DOCUMENTS

| 7,110,393 B1* | 9/2006 | Tripathi et al. ............ 370/352 |
| 2002/0181424 A1* | 12/2002 | Shaheen et al. ............ 370/338 |
| 2003/0035401 A1* | 2/2003 | Shaheen et al. ............ 370/341 |
| 2003/0185177 A1* | 10/2003 | Chitrapu et al. ............ 370/335 |
| 2003/0185188 A1* | 10/2003 | Chitrapu et al. ............ 370/338 |
| 2003/0185190 A1* | 10/2003 | Chitrapu et al. ............ 370/338 |
| 2004/0248615 A1* | 12/2004 | Purkayastha et al. ...... 455/552.1 |
| 2005/0050211 A1* | 3/2005 | Kaul et al. .................. 709/229 |
| 2005/0114513 A1* | 5/2005 | Dorenbosch et al. ....... 709/227 |
| 2005/0198363 A1* | 9/2005 | Ling et al. .................. 709/236 |

OTHER PUBLICATIONS

Schulzrinne et al., "The Session Initiation Protocol: Internet-centric signaling", IEEE Communications Magazine, vol. 38 issue 10, pp. 134-141, ISSN 0163-6804, Oct. 2000.*

* cited by examiner

*Primary Examiner*—Gilberto Barron, Jr.
*Assistant Examiner*—Hadi Armouche
(74) *Attorney, Agent, or Firm*—Volpe and Koenig, P.C.

(57) ABSTRACT

Method and apparatus employing transparent session initiation protocol (SIP) technique for communication especially between a user device in one domain and an application/service provide in an external domain. The transparent SIP technique is usable in wired or wireless systems such as 3G systems and wireless local area networks (WLANs).

19 Claims, 10 Drawing Sheets

P-CSCF DISCOVERY USING DHCP AND DNS (SOURCE: 3GPP TS 24.228 V5.6.0 (2003-09))

P-CSCF DISCOVERY USING PDP CONTEXT ACTIVATION SIGNALING (SOURCE: 3GPP TS 24.228 V5.6.0 (2003-09))

MOBILE ORIGINATING WITH SBLP WITHOUT RESOURCE RESERVATION PROTOCOL, ONLY GPRS PROCEDURES (SOURCE: 3GPP TS 24.228 V5.6.0 (2003-09))

MSC (MESSAGE SEQUENCE CHART): TRANSPARENT SIP FOR EXTERNAL DOMAINS IN 3G NETWORKS

TRANSPARENT SESSION INITIATED PROTOCOL

CROSS REFERENCE TO RELATED APPLICATION(S)

This application claims priority U.S. provisional application No. 60/582,035 filed Jun. 22, 2004, which is incorporated by reference as if fully set forth.

FIELD OF INVENTION

The present invention relates to session initiation protocol (SIP) in a communication system and, in particular, to an apparatus and method for significantly reducing the number of interfaces required between caller and called agents.

BACKGROUND

A typical SIP scenario involves one or more proxy/re-direct servers as shown in FIG. 1. The "trapezoidal" arrangement shown therein includes a caller (UA1) entity and a called (UA2) entity. The UA1 caller may be anyone of a variety of user equipments (UEs) such as a properly equipped laptop, PDA, wireless cell phone capable of transmitting and receiving data as well as voice, and so forth. One important SIP feature is the ability to invite new participants to a call.

A user is identified in SIP using an SIP uniform resource identifier (URI) which may, for example, be UA1 at Domain (A). The Domain (A) server, Proxy 1, determines an SIP server for Domain (B), in this case, Proxy 2, using directory name service (DNS) procedures. During the message exchange, the caller UA1 and called UA2 entities exchange addresses at which they would like to receive communicated media from each other.

Once session establishment is completed, the caller/called entities can exchange data directly without involvement of the SIP proxies, such as Proxy 1 and Proxy 2. Conventionally, the control signals are communicated as illustrated by control signal lines CS via the proxy servers while the media content is shared as illustrated by media line MS.

Conventional techniques require that users in a particular network must always use the SIP proxy servers of that network operator in order to establish a SIP session. Third party application providers make their servers available to the network operator via open interfaces. The network operator makes these third party servers, and the applications they provide, available to the user via proxy servers within their networks. Typically, the network operator charges the user for access to the service with only a small amount of the revenue passed through to the third party application server provider.

The servers in the operators network are used to provide access to the third party application servers. The network operator controls the use of these servers and as a result, also controls access to the third party application servers. The present invention enhances access to third party application servers from user devices attached to operator networks and also provides the ability to increase the revenue stream for those services to the third party providers.

The objective of the present invention is to address scenarios where SIP is employed for contacting a third party application or content server transparently. The motivation behind this invention is the provision of a transparent means of network traversal to access third party application and content servers located outside of the operators' network.

BRIEF DESCRIPTION OF THE INVENTION

The present invention provides for the utilization of "smart" SIP Proxy Agent Middleware (SPAM) which are preferably integrated into user devices. In a preferred embodiment, all user agents (UAs) in a user device are configured with SPAM as an outbound proxy. A User Agent (UA) is a logical entity that both creates new SIP requests and responds to received SIP requests. A user device refers to a physical communication device such as a mobile phone, PDA, laptop or other type of network connectable communication device. There can be more than one User Agent in a user device at any instant of time.

Preferably, the address of the SIP proxy server, which is illustrated in the Figures as Proxy 1 in Domain A, and the address of the internal domain, which is the network operator's domain i.e. Domain A, are provided to SPAM. Depending upon the domain that the UA is trying to contact, SPAM preferably determines whether the request has to be handled internally, i.e., within the network operator's domain or externally, i.e., transparently for networks outside of the operator's domain.

The above as well as other objects of the invention will become apparent when reading the accompanying detailed description in conjunction with the drawings in which like elements are designated by like numerals.

BRIEF DESCRIPTION OF THE DRAWING(S)

DETAILED DESCRIPTION OF THE PREFERRED EMBODIMENT(S)

In order to simplify communication between the calling and called entities, the present invention provides method and apparatus which employ an improved session initiation protocol (SIP) for transparently contacting third party applications or content servers. A transparent means of network traversal is provided to access to third party application and content servers located outside of the operator's network.

To accomplish this, "smart" SIP proxy agent middleware (SPAM) is provided in user devices which are conveniently referred to as User Equipments (UEs). In a preferred embodiment, all user agents (UAs) in a UE are manually configured with SPAM as an outbound proxy. A User Agent (UA) is a logical entity that both creates new SIP requests and responds to received SIP requests. A User Equipment (UE) refers to the physical user device such as a mobile phone, PDA, laptop or other type of network connectable communication device which may serve as an SIP terminal. There can be more than one User Agent in a UE at any instant of time.

Figure 1:
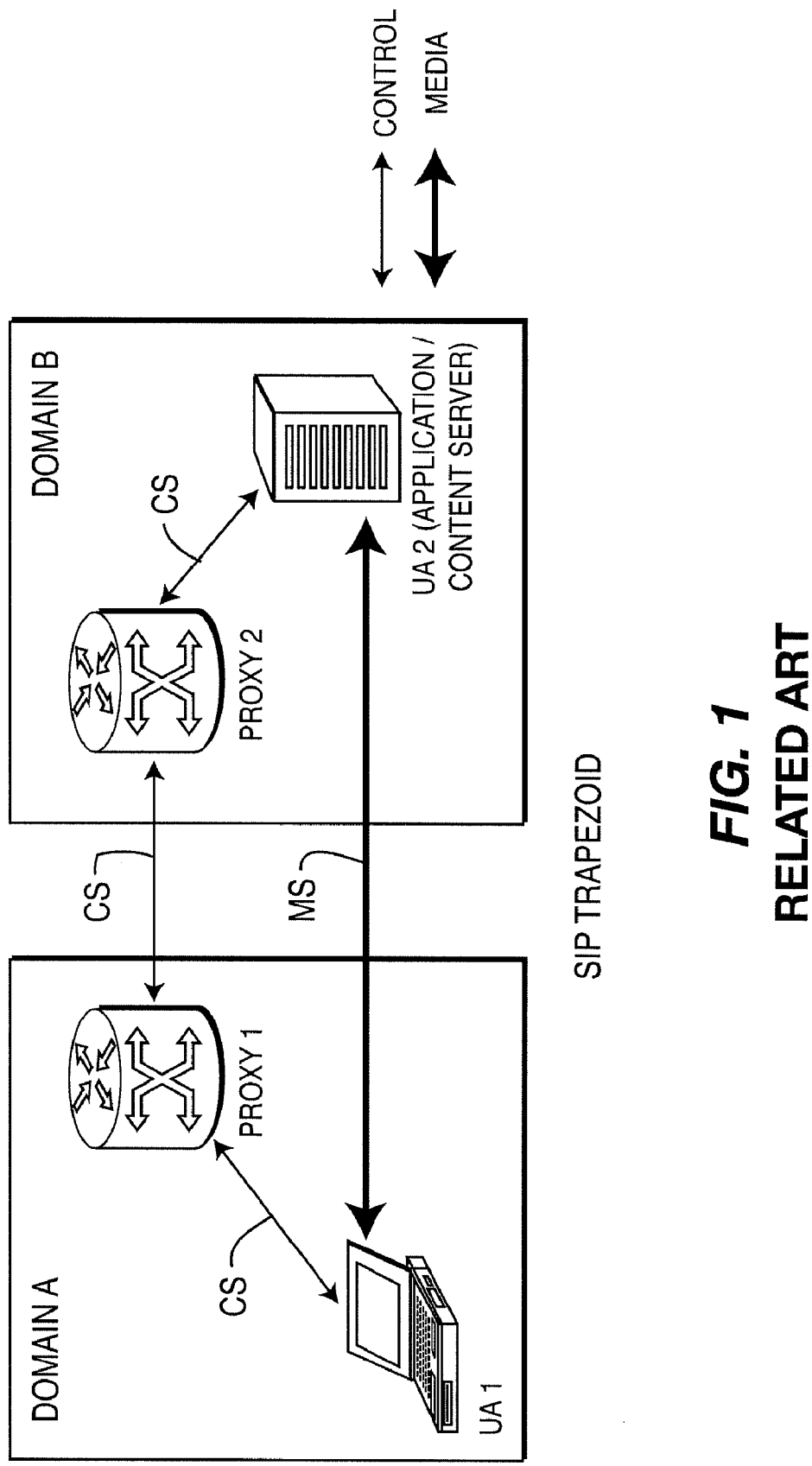
FIG. 1 is a overview diagram illustrating a conventional SIP scenario employing two proxy/re-direct servers.

The address of the SIP proxy server, which, for the example illustrated in FIG. 1, is the proxy server in a domain A, and an internal domain which is the network operator's domain, are provided to SPAM. Depending on the domain that a UA is attempting to contact, SPAM determines whether the request has to be handled internally, i.e., within the network operator's domain or externally, i.e., transparently for networks outside of the operator's domain.

Figure 2:
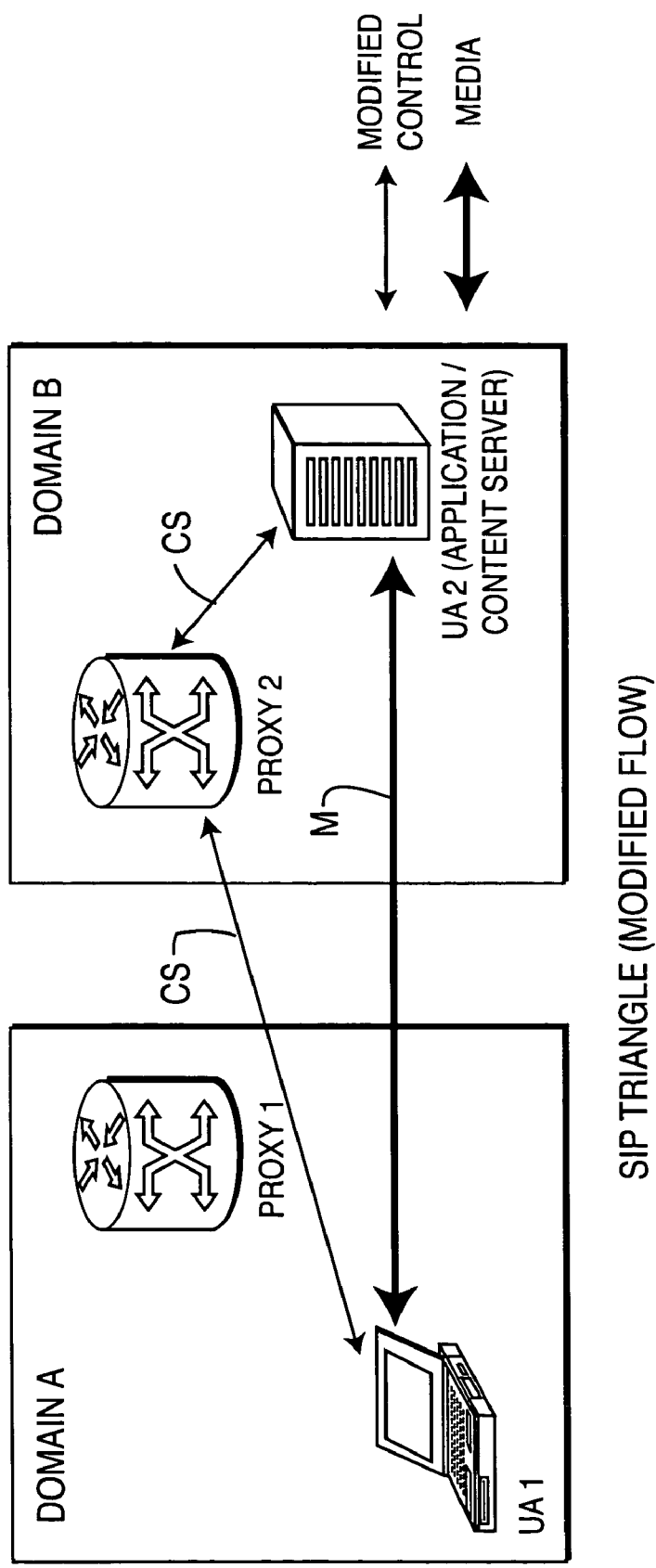
FIG. 2 is a simplified diagram utilizing the method and apparatus of the present invention for accessing a third party application server.

For external domains, i.e., networks outside of the operator's domain, SPAM determines the SIP server of the external domain by, for example, identifying the IP address, port and transport protocol for the external domain's proxy server, such as Proxy 2 in Domain B illustrated in FIGS. 1 and 2, by performing a directory name service (DNS) lookup.

For an internal domain, such as within the network operator's Domain (A), the request is sent to the SIP proxy server, Proxy 1 in Domain A specified by the operator, wherein internal services provided are obtained in a conventional manner.

With reference to FIG. 2, when external services are desired, SPAM provides the SIP uniform resource identifier (URI) for UA1 in the form of a numerical internet protocol (IP) address of an SIP terminal, for instance UA1, at 162.178.9.6, in which the internal domain proxy server, Proxy 1 of Domain A, is omitted when performing SIP transactions. This architecture is utilized when the SIP terminal, i.e. UA1, initiates a call to a third party application/content server. More specifically, in the example of FIG. 2, UA1 utilizes the SIP URI for Proxy 2 of Domain B in order to access services from content server UA2. The control communications links between UA1, Proxy 2 and UA2 are identified as CS, the media communication link which is established is illustrated as MS. Accordingly, SPAM enables the SIP terminal, UA1 to bypass Proxy 1 of Domain A.

Figure 3:
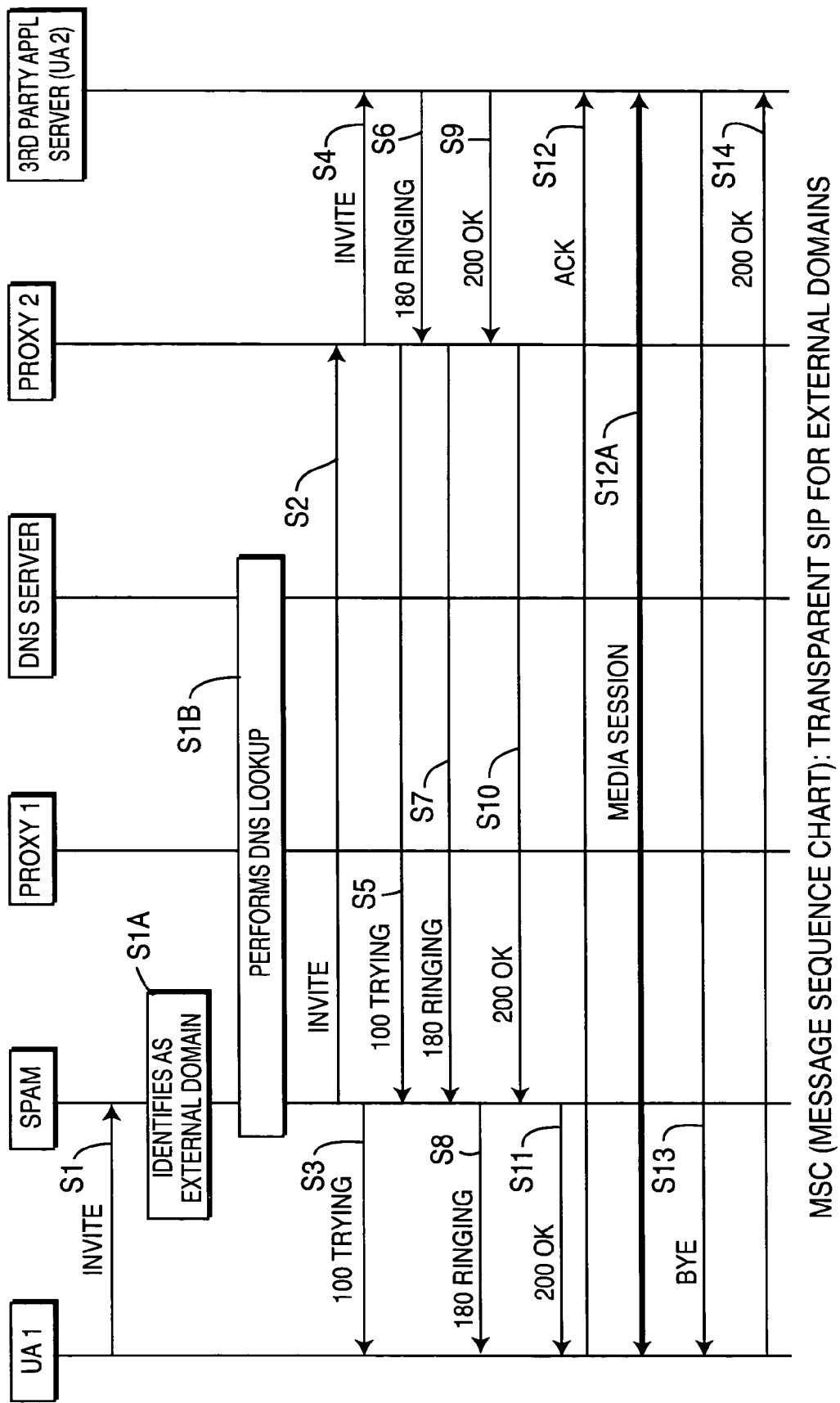
FIG. 3 is a detailed flow diagram of a transparent SIP for external domains in accordance with the present invention.
Figure 4:
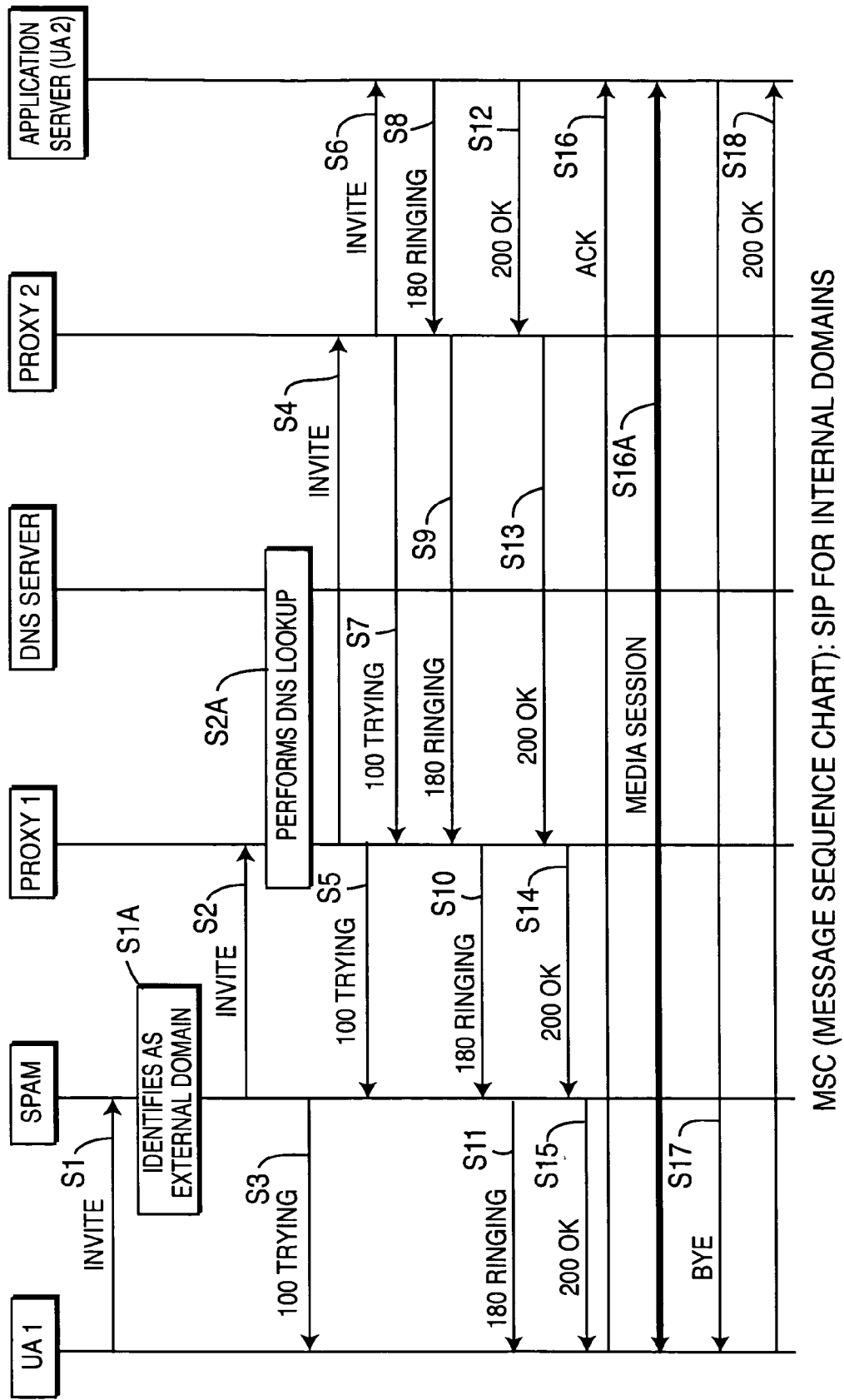
FIG. 4 is a detailed flow diagram of a SIP employed for internal domains.

Specific example of the processes involved are illustrated in FIGS. 3 and 4 which show a flow diagram of a user device employing transparent SIP for communication with external domains. Although UA1 and SPAM are illustrated separately in FIGS. 3 and 4, preferably they are both implemented in the physical user device employed as the SIP terminal acting as "caller." At step S1, UA1 sends an invitation signal, Invite, to SPAM. At S1A of FIG. 3, SPAM then identifies the Invite as an external domain. A preferred procedure for the case where SPAM identifies the Invite as a request for internal services is illustrated in FIG. 4.

For the external service case of FIG. 3, at S1B, a DNS lookup is performed by SPAM, such as by SPAM accessing a DNS Server via Proxy 1. Upon obtaining the address of the proxy server of the external domain, in this case Proxy 2 of Domain B, at step S2, an Invite from SPAM is communicated to Proxy 2. At step S3, SPAM preferably reports a 100 "trying" communication to UA1.

Proxy 2, responsive to the Invite from SPAM, communicates, at step S4, an Invite signal to a called third party application server, in this case UA2. Preferably, at step S5, Proxy 2 also sends a 100 "trying" communication to SPAM which may be relayed to UA1.

UA2, responsive to the Invite (step S4), preferably sends a 180 Ringing communication to Proxy 2 at step S6, which, at step S7, preferably sends a 180 Ringing communication to SPAM which, in turn preferably sends a 180 Ringing communication to UA1, at step S8.

Acceptance of the Invite (step S4) by UA2, preferably results in a 200 OK message, at step S9, which is communicated to Proxy 2. Proxy 2 then, at step S10, sends a 200 OK communication to SPAM, which, in turn, sends a 200 OK communication to UA1, at step S11. Responsive to the 200 OK communication (step S11), UA1 sends an acknowledgement (ACK) directly to UA2, at step S12, whereupon a Media session is initiated at step S12A via a conventional link that bypasses the proxy servers.

Upon completion of the media session, UA2 sends a BYE communication to UA1, at step S13 whereupon UA1, at step S14, responds with a 200OK communication to UA2. Such session termination corresponds with conventional techniques; by definition SIP are protocols which are directed to the control of session initiation.

FIG. 4 is a flow diagram of a preferred method of employing SIP for internal domains wherein UA1, at step S1, sends an invitation signal, Invite, to SPAM which, at step S1A, SPAM identifies the Invite as being directed to an internal domain. At step S2, SPAM sends an Invite to Proxy 1, and preferably, at step S3, sends a 100 Trying communication to UA1. Proxy server, Proxy 1, may be the server which controls the provision of the requested internal service, in which case Proxy 1 continues by directly contacting the "called entity" within the common Domain.

In the case shown in FIG. 4 where another proxy server, Proxy 2, controls the "called entity" UA2 which provides the desired internal services, Proxy 1, responsive to the Invite (step S2), performs a DNS lookup, at step S2A, and sends an Invite to Proxy 2, at step S4, and further sends a 100 Trying communication to SPAM, at step S5. Proxy 2, responsive to the Invite (step S4), sends an Invite to UA2, at step S6 and sends a 100 trying communication to Proxy 1, at step S7. In FIG. 4, UA2 and Proxy 2 are in same domain as UA1 and Proxy 1.

The UA2, at step S8, sends a 180 Ringing communication to Proxy 2 which responds by sending a 180 Ringing communication to Proxy 1, at step S9, Proxy 1 responding thereto by sending a 180 Ringing communication to SPAM, at step S10. SPAM, at step S11, sends a 180 Ringing communication to UA1.

Upon acceptance of the Invite (step S6), UA2 sends a 200 OK communication to Proxy 2, at step S12, Proxy 2 sending a 200 OK communication to Proxy 1, at step S13, and SPAM receiving 200 OK from Proxy 2 at step S13, responding thereto by sending a 200 OK to UA1, at step S15. UA1 responds to the 200 OK by sending an Acknowledgement (ACK) to UA2, at step S16, and a Media session between UA1 and UA2 is set up, at step S16A.

When a session is completed, UA2, at step S17, sends a BYE to UA1 which responds with a 200OK communication to UA2, at step S18.

The user devices which are configured with the SPAM associated with UAs may be configured for operation within either a wired or wireless embodiment. Accordingly, the user device may take the form of a wireless transmit receive unit (WTRU) configured for use in a wireless network such as a wireless local area network (WLAN) employing one or more of the IEEE 802 family of standards or a Universal Mobile Telecommunications Systems (UMTS) employing code division multiple access (CDMA). The term WTRU includes but is not limited to a user equipment (UE), mobile station, fixed or mobile subscriber unit, pager, or any other type of device capable of operating in a wireless environment.

Figure 5:
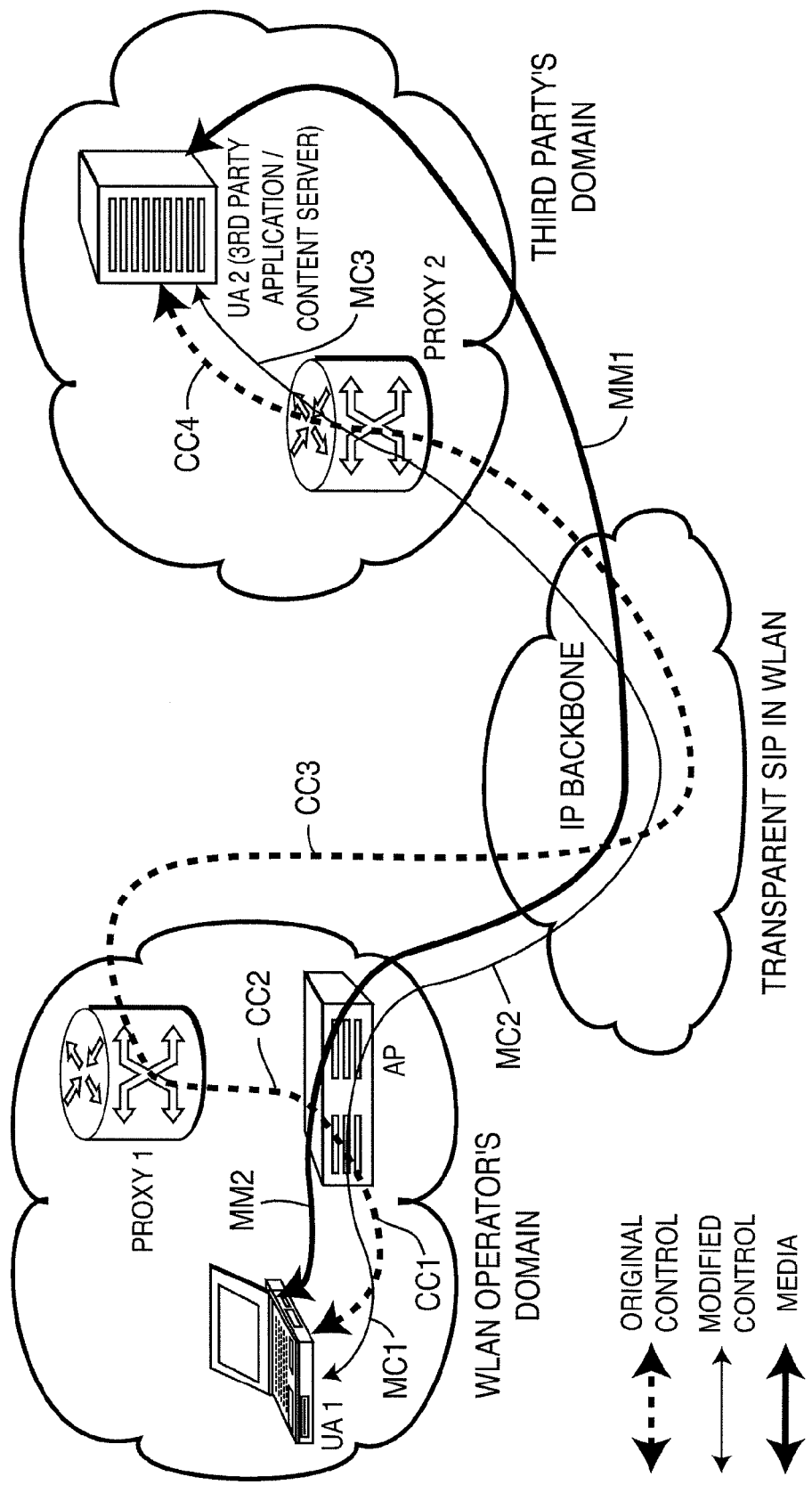
FIG. 5 is a simplified diagram of both the conventional technique and the technique of the present invention employing a transparent SIP in a wireless local area network (WLAN).

FIG. 5 is a simplified diagram comparing the conventional SIP technique with the SIP Transparent technique of the present invention in which transparent SIP is utilized in a wireless local area network (WLAN), for example. The conventional control technique is illustrated as a dotted line denoted original control and shows UA1 communicating via an access point (AP) of a WLAN at CC1. The AP in turn communicates via Proxy 1 at CC2. Proxy 1 communicates via an internet protocol (IP) backbone with Proxy 2 at CC3. Proxy 2 communicates with the third party application/content server UA2 at CC4.

Utilization of the control technique of the present invention is illustrated with the lighter weight solid line identified as Modified Control that shows UA1 communicates with the UA2 through the AP, IP backbone and Proxy 2 as indicated by the modified control links MC1, MC2 and MC3. In both cases, the content services provided from UA2 through the IP backbone and the AP to UA1 is shown by the heavy line media connection MM1, MM2. However, using the modified control path, Proxy 1 is bypassed due to the use of the transparent SIP in the WLAN for SIP call control flow.

Figure 6A:
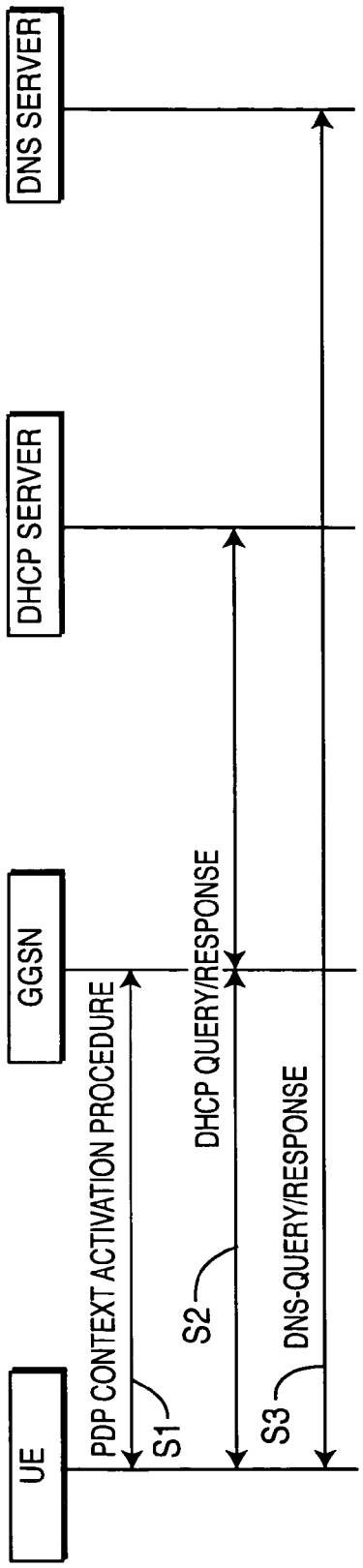
FIGS. 6A and 6B show flow diagrams of conventional Proxy-call state control function (P-CSCF) discovery using dynamic host configuration protocol (DHCP) and directory name service (DNS) and using packet data protocol (PDP) context activation signaling respectively. (Source: 3GPP TS 24.228 V5.6.0 (2003-09).
Figure 6B:
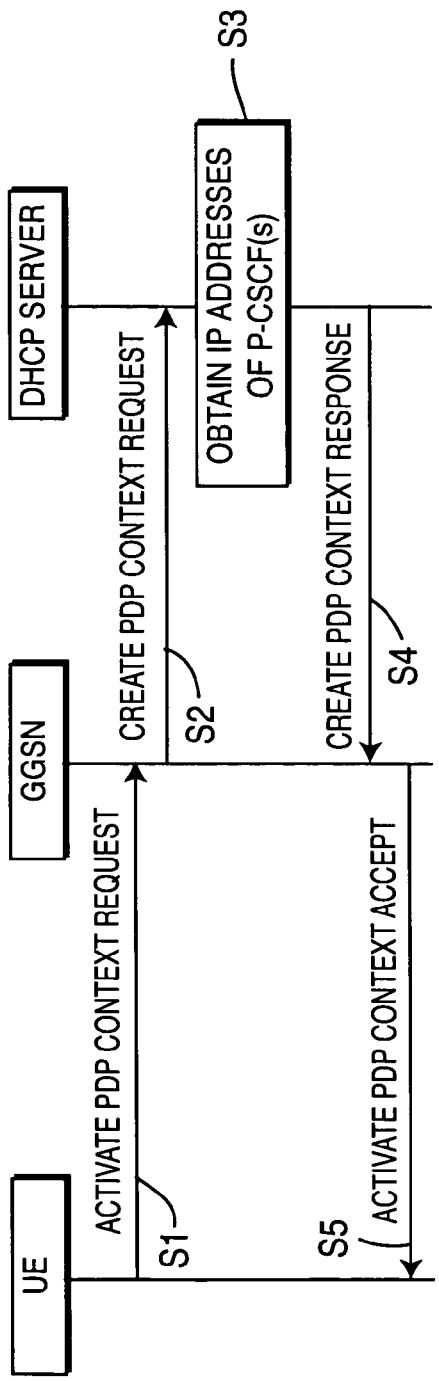

Conventional SIP call flows emanating in a third generation partnership project (3GPP or 3G) communication system, such as specified in 3GPP Technical Specification 24.228 V5.6.0 (2003-09) are shown in FIGS. 6A and 6B. With reference to FIG. 6A, a UE performs a general packet radio service (GPRS) Attach, performing a PDP context activation procedure, at step S1, which step is conducted with a Proxy-call state control function (P-CSCF) to a Gateway GPRS Support Node (GGSN). An address is obtained using a dynamic host configuration protocol (DHCP) procedure, utilizing DHCP and DNS queries, which take place between the UE and the GGSN, and the GGSN and a DHCP server, as shown at step S2. The DSN query/response takes place in a communication between the UE and a DNS server, at step S3, which steps are conventional.

FIG. 6B shows the manner in which the procedure for P-CSCF discovery is employed using an activate PDP context request. More particularly, the UE at step S1, activates the PDP context request. Responsive thereto, the GGSN at step S2 creates a PDP context request which is communicated to the DHCP server. The DHCP server at step S3, obtains IP addresses of P-CSCF(s). A PDP context response is created by the DHCP server and communicated to the GGSN, at step S4 which, in turn, provides an activate PDP context accept and communicates this to the UE, at step S5.

Figure 7:
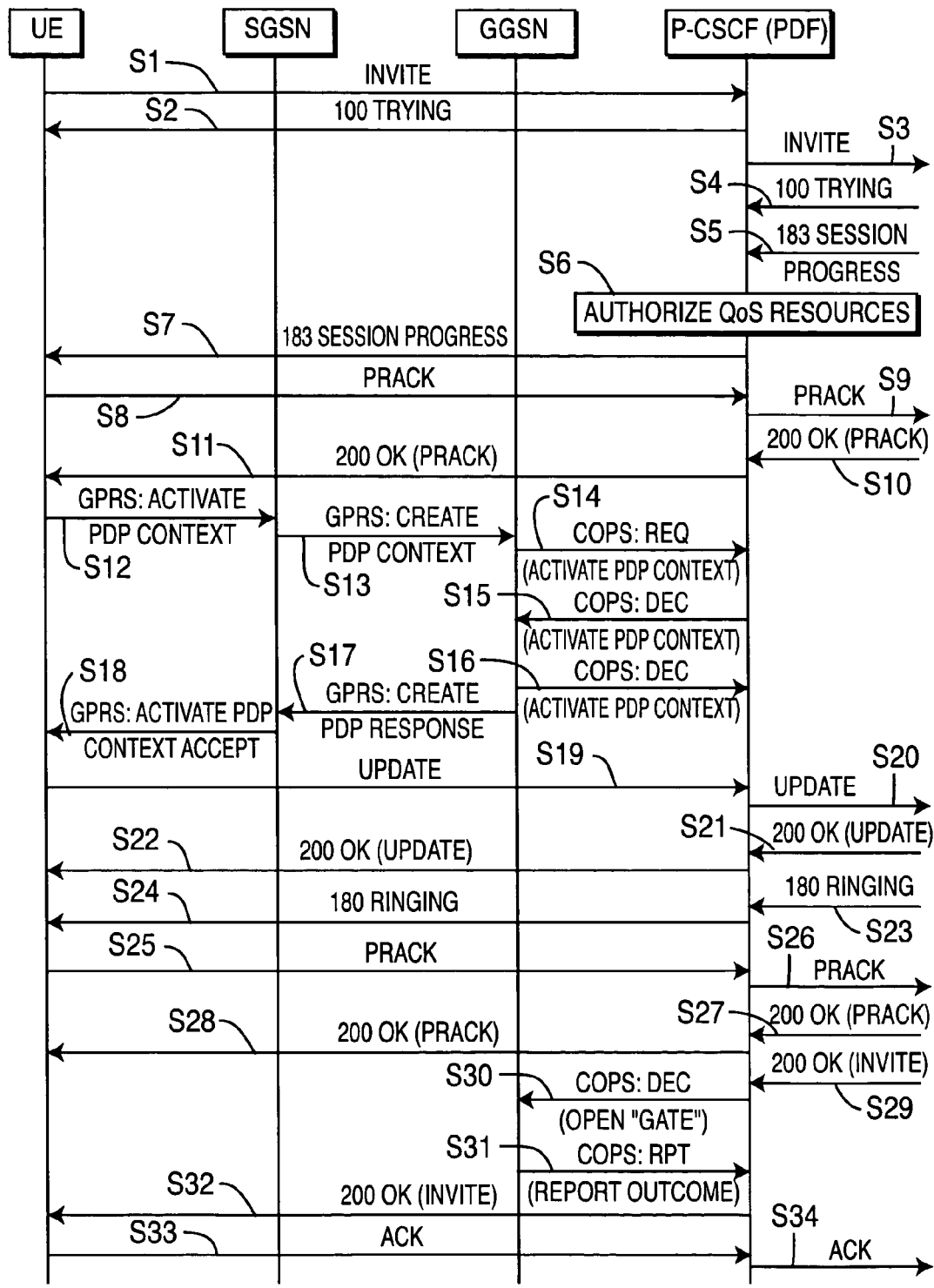
FIG. 7 is a flow diagram of a conventional mobile originating network with service based local policy and without resource reservation protocol (RRP) for general packet radio service (GPRS) procedures.

FIG. 7 shows an example of General Packet Radio Service (GPRS) and Common Open Policy Service (COPS) interactions during a session setup when a service based local policy (SBLP) is applied. FIG. 7 shows a conventional mobile originating (MO) network example, such as specified in 3GPP Technical Specification 24.228 V5.6.0 (2003-09). Since a serving CSCF (S-CSCF) is not involved in the GPRS interaction it has been omitted from the flow diagram, but it is assumed that a serving CSCF (S-CSCF) or interrogating CSCF (I-CSCF) is the next entity in the signaling flow and is referred to as a "next entity" in the example as explained below. The GPRS comprises part of a Universal Mobile Telecommunications System (UMTS) access system for UEs configured for use in such a 3G system. The (S-CSCF) and next entities form part of an IP Multi-Media Core Network (CN) Subsystem that interfaces with the Internet.

At step S1, a UE communicates an Invite to a P-CSCF, operating as a Policy Decision Function (PDF). The P-CSCF, at step S2, sends a 100 trying communication to the UE and, at step S3, sends an Invite to the next entity. The next entity, at step S4, sends a 100 trying communication to the P-CSCF and, at step S5, the next entity sends a 183 session progress communication to the P-CSCF. At step S6, the P-CSCF authorizes the Quality of Service (QoS) resources and, at step S7, sends a 183 session progress signal to the UE. The UE, responsive to step S7, sends, at step S8 an acknowledgement signal (PRACK) to the P-CSCF which, at step S9, relays the PRACK to the next entity.

SIP defines two types of responses, provisional and final. Final responses convey the result of the request processing, and are sent reliably. Provisional responses provide information on the progress of the request processing, but are not sent reliably in RFC 3261. It has been observed that reliability is important in several cases, including interoperability scenarios with a Public Switch Telephone Network (PSTN). Therefore, an optional capability was needed to support reliable transmission of provisional responses. That capability is provided by PRACK (refer RFC 3262). Reliable responses are retransmitted by the Transaction User (TU) with an exponential backoff. Those retransmissions cease when a PRACK message is received. The PRACK request plays the same role as ACK, but for provisional responses.

The next entity, at step S10, sends a 200 OK (PRACK) to the P-CSCF which relays this message to the UE, at step S11. At step S12, the UE sends a GPRS: ACTIVATE PDP context to a Serving GPRS Support Node (SGSN) which, at step S13, sends a GPRS create PDP context to a GGSN, which, at step S14 sends a COPS: request (REQ) activate PDP context to the P-CSCF, which, responsive to step S14, sends a COPS:DEC policy information communication to the GGSN, at step S15. The GGSN, at step S16, sends a COPS:RPT activate PDP context to the P-CSCF and, at step S17, the GGSN sends a GPRS: create PDP response to the SGSN, which, responsive to step S17, sends a GPRS:ACTIVATE PDP context accept to the UE, at step S18.

The UE, at step S19, sends an update to the P-CSCF which relays this to the next entity, at step S20. The next entity, at step S21 sends a 200 OK update to the P-CSCF which relays this message to the UE, at step S22. The next entity, at step S23, also sends a 180 ringing message to the P-CSCF which relays this message to the UE, at step S24. The UE, at step S25, sends an PRACK to the P-CSCF which relays this message to the next entity, at step S26. The next entity, at step S27, sends a 200 OK (PRACK) to the P-CSCF which relays this message to the UE, at step S28.

At step S29, the next entity sends a 200 OK (INVITE) to the P-CSCF which, at step S30, sends a COPS:DEC (open "gate") to the GGSN. The GGSN, at step S31, sends a COPS: RPT (report outcome) to the P-CSCF, which sends a 200 OK (INVITE) to the UE, at step S32. Responsive thereto, the UE sends an ACK to the P-CSCF, at step S33, which conveys the ACK message to the next entity, at step S34.

Figure 8:
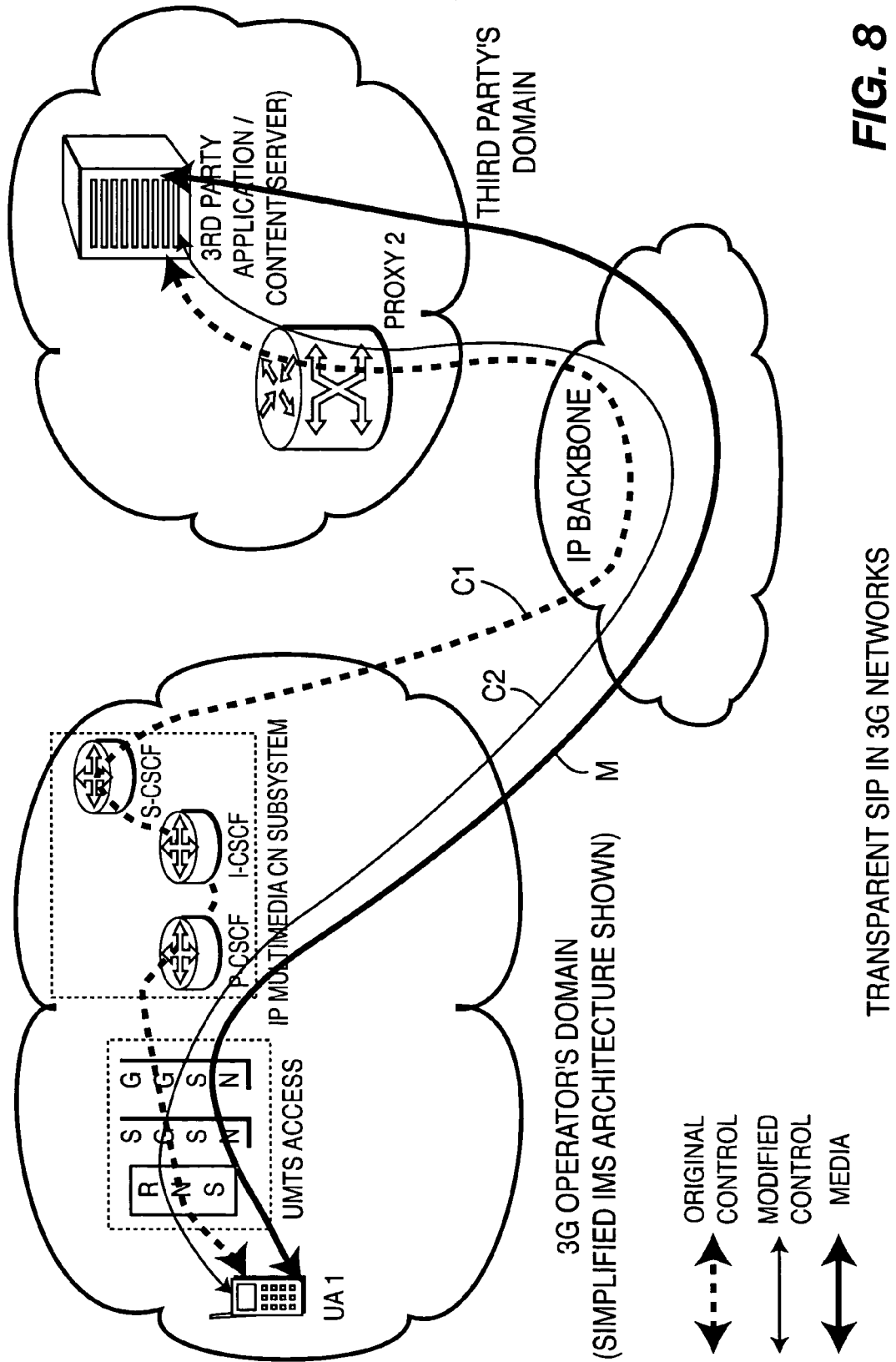
FIG. 8 is a simplified diagram of the employment of transparent SIP in third generation (3G) networks.

FIG. 8 shows a 3G Network in which a conventional control path is shown by dotted line C1 denoted Original Control and a control path in accordance with the present invention is shown by thin solid line C2 denoted modified Control. The media path for both cases is illustrated by heavy solid line M. Using conventional control techniques, such as described in connection with FIG. 7, UA1 interacts with the UMTS access components (which includes the Radio Network Subsystem (RNS), SGSN, GGSN), the IP Multi-Media CN Subsystem (IMS) (which includes the P-CSCF, I-CSCF, S-CSCF) in order to establish a control path via the Internet between UA1 and the proxy server, PROXY 2, and the third party application/content server in the third party domain. Employing the transparent SIP technique of the present invention, the IP Multi-Media CN Subsystem (IMS) is omitted from the control path and the UA1 communicates directly with the PROXY 2 and third-party application/content server employing only the RNS, SGSN and GGSN UMTS access components. The media path M remains the same using the conventional control technique for the transparent SIP technique.

Figure 9:
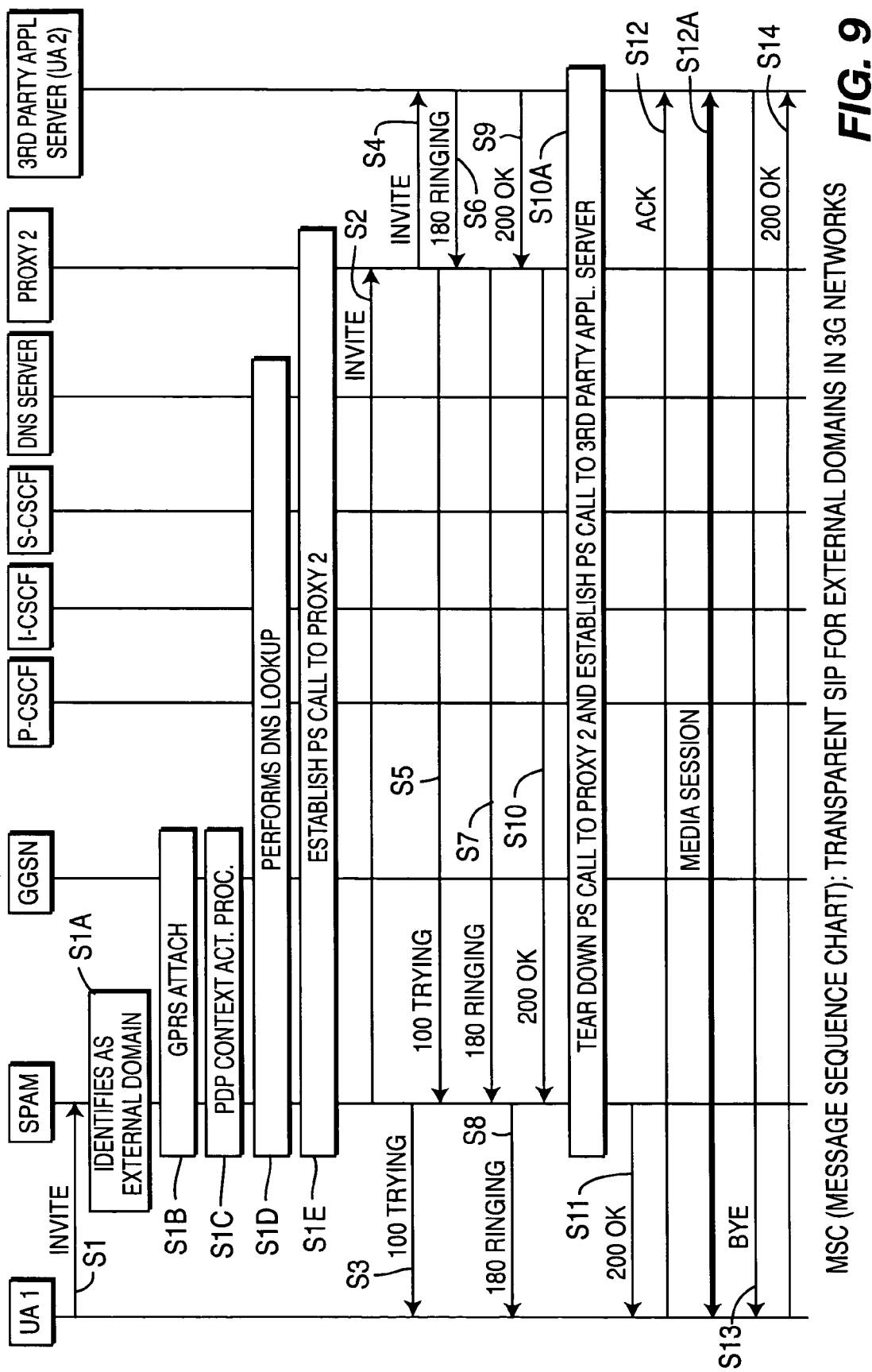
FIG. 9 is a flow diagram of a mobile switching center transparent SIP for external domains.

FIG. 9 is a flow-diagram illustrating an example of the transparent SIP technique for external domains employed in a 3G system in which preferably the user agent UA1 and SPAM are implemented in a UE configured for use in a 3G system. Alternatively, SPAM could be embodied in one of the UMTS access components. UA1, at step S1, sends an Invite to SPAM which, at step S1A, identifies the third party application/server (UA2) as being located in an external domain and, at step S1B, invokes a GPRS attach.

The SPAM, at step S1C, establishes PDP context bearer by using a PDP context establishment procedure, which is conventional, and is described at 3GPP TS 24.008. "ACT" in step S1C stands for "PDP Context Activation Procedure." At step S1D, SPAM performs a DNS lookup, and identifies IP address, port and transport protocol for Proxy 2 in external domain B, by communicating with a DNS server.

The SPAM, at step S1E, then establishes a packet switched (PS) call to Proxy 2 in Domain B. Thereafter, the remaining steps S2 through S14 are conducted between UA1, Proxy 2 and UA2 are substantially identical to those shown and described in FIG. 3, except that, after step S10 and before step S11, the SPAM performs a function of tearing down the PS call to Proxy 2 and establishes a PS call to the third party application server UA2 to implement the transfer of media content. It can be seen from a comparison of FIGS. 7 and 9 that a significant number of steps are eliminated during the control phase as well as eliminating the need for utilization of the entities such as the SGSN and the IP Multimedia CN subsystems.

Significant advantages of the transparent SIP technique for use in 3G networks resides in the fact that IMS is exclusively Internet Protocol Version 6 (IPv6) which provides support for identity and can be used to identify flows and improve QoS. 3GPP IP Multimedia terminals were required to exclusively use IPv6 to access the IMS and the IMS SIP server and proxy server support exclusively IPv6. Hence, all the traffic going to the IMS had to be IPv6, even if the UE is dual stack capable, i.e., is capable of supporting both IPv4 and IPv6 and this impacts both signaling and user traffic. Accordingly, prior to the present invention, there was no means to use SIP-based applications in 3GPP Re199 and Re14 version networks.

Apart from the obvious advantage of providing a transparent means of network traversal to access third party application and content servers located outside of the operator's network, transparent SIP has the following additional advantages when used in a 3G network:

The transparent SIP is independent of IP version used, (e.g. IPv4, IPv6 or later conceived versions).

Provides a means to use SIP based applications in 3GPP Re199 and Re14 version networks.

The SPAM may be integrated into U100 platforms such as the Ericsson Mobile Platform U100, which is dual mode-enabled and supports both GPRS for the Global System for Mobile Telecommunications (GSM/GPRS) and WCDMA.

The SPAM may be integrated into the U100 Middleware, is not processor intensive and SIP based applications that use SPAM for Re14 and Re199 versions of the GPP can also be incorporated therein.

The SPAM may be advantageously integrated into any other mobile units of similar capabilities such as an Ericsson U100.

Figure 10:
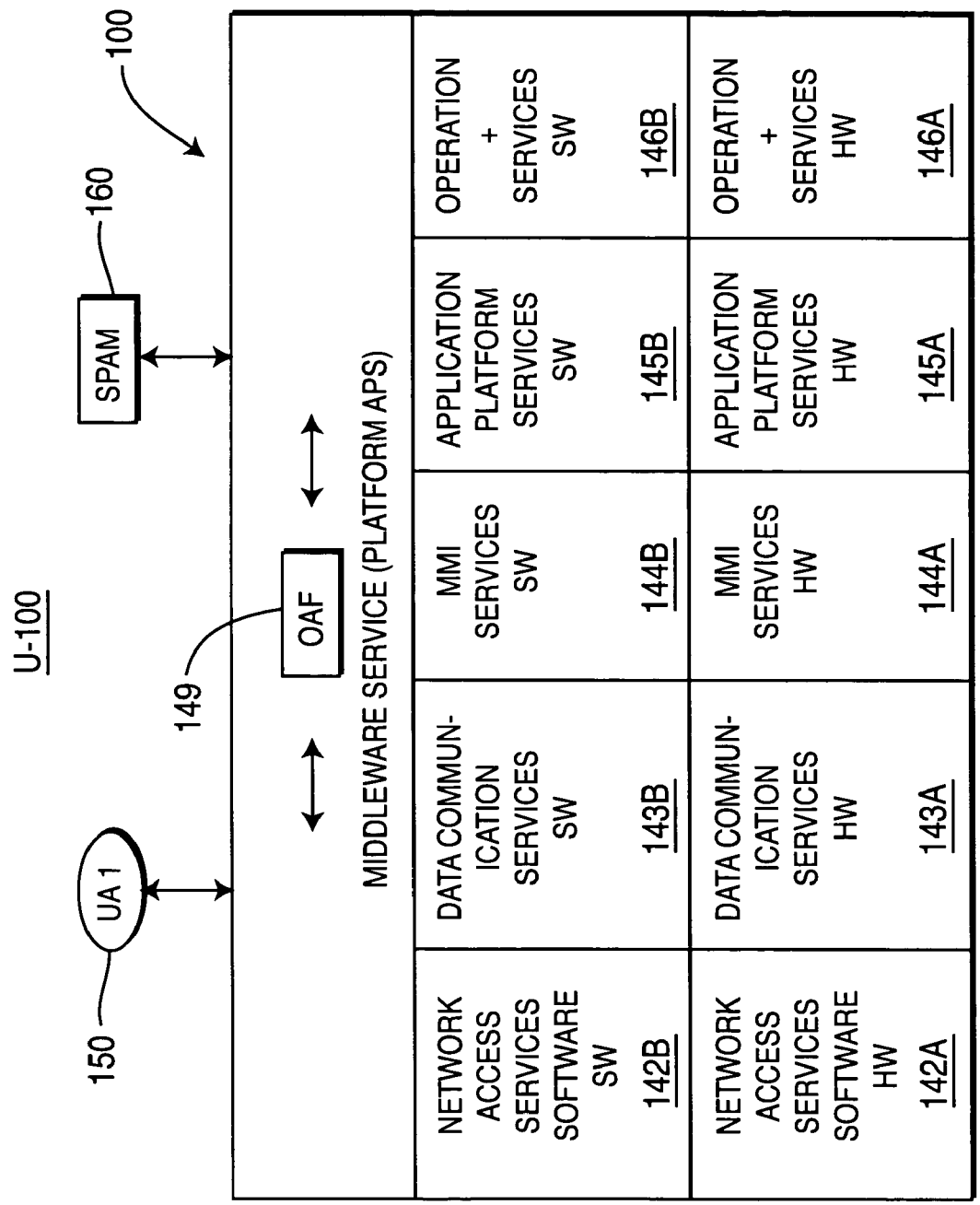
FIG. 10 is an illustration of an example user device made in accordance with the teaching of the present invention.

FIG. 10 is a simplified diagram of a UE configured to implement the technique of present invention. The UE 100 preferably comprises a U-100 platform, such as an Ericsson U-100 capable of supporting UMTS. The U-100 platform is dual-mode enabled and supports both GSM/GPSR and WCDMA and has 3G functionality. However, the Erricsson U-100 is merely exemplary of U-100 platforms and the capabilities of the present invention may be incorporated into any other platforms of like functionality and capability.

The UE 100 preferably includes hardware (HW) for network access services, data communication services, multimedia interface services, application platform services and operation and related services respectively shown at 142A through 146A. The UE 100 also preferably includes software supporting these services being shown respectively at 142B through 146B. Middleware services 149 are preferably implemented in connection with a platform application programming interface (API) as well as the open archives, open application framework (OAF) which is integrated into the middleware services and functions to manage all interfaces of the platform with the underlying services. For example, the user interface (UA1) 150, which is/may be JAVA-based, enables a user to operate the mobile terminal to turn on, turn off, input data, select from among stored menus, etc. may, when the platform takes the form of a cell phone, have a conventional telephone keypad together with other operating buttons to provide on/off, scan, mode selection and other typical functions. Alternatively, the manual interface may be a keyboard type input or the manual input may be a touch screen type or the like. The user interface 150 is managed by the OAF 149. The user interface 150 need not be Java-based and may support any other suitable programming language. The SPAM 160 is preferably integrated into the UE middleware to enhance the U-100 platform.

What is claimed is:

1. A method for use by a user device (UA) for performing functions of a session initiated protocol (SIP) proxy agent, comprising:

providing at least one user agent and proxy agent in the user device, incorporating an address of an SIP proxy server and an internal domain in said proxy agent said user agent:

requesting invitation of a session;

said proxy agent:

determining whether the request for invitation is to be handled within the network of the operator's domain or outside of the operator's domain responsive to said invitation; and identifying a SIP server network outside of the operator's domain when the invitation is directed to an SIP server outside of the operator's domain.

2. The method of claim 1 wherein identifying the SIP server network outside of the operator's domain by said proxy agent further comprises:

identifying an internet protocol (IP) address, port and transport protocol for a proxy in the external domain employing directory name service (DNS) lookup.

3. The method of claim 1 wherein, for a session within the network operator's domain, said proxy agent:
sends a request to a proxy in the network operator's domain specified by an operator such that internal services provided are directly obtained.

4. The method of claim 1 wherein said proxy agent:
provides an SIP uniform resource identifier (URI) to external domains in the form of a numerical IP address of an SIP terminal, thereby eliminating communication with a Proxy 1 of the network operator's domain.

5. The method of claim 4 wherein the step of providing the SIP URI to an external domain by said proxy agent includes:
providing said SIP URI responsive to a call to a third party application/content server.

6. A method employed by a user device (UA) in a home domain to contact a third party application server (AS) in a domain outside of the user device's home domain, comprising:
the user device:
initiating an Invite communication employing transparent SIP by a user agent provided in the user device;
providing the user device with a proxy agent, the proxy agent, responsive to the Invite communication:
identifying the Invite communication as directed to an external domain;
performing a directory name service (DNS) lookup; and
communicating an Invite communication to a proxy server (Proxy 2) of the outside domain responsive to said DNS lookup;
said Proxy 2 of said external domain:
sending an Invite communication to the third party AS identified by the Invite communication initiated by the user device; and
said third party AS:
communicating with said proxy agent through said Proxy 2 to initiate communication between said third party AS and the user device.

7. The method of claim 6 wherein said AS initiates a media session directly with the user device responsive to the user device:
sending an acknowledgment (ACK) directly to said third party application server.

8. A method employed by a user device in a home domain to contact a third party application server (AS) located in the user device's home domain, comprising:
the user device:
initiating an Invite communication employing transparent SIP by a user agent provided in the user device;
providing the user device with a proxy agent, said proxy agent, responsive to the Invite communication:
identifying the Invite communication as directed to an internal domain;
performing a directory name service (DNS) lookup; and
communicating an Invite communication to a proxy server (Proxy 1) of the home domain responsive to said DNS lookup;
said Proxy 1
sending an Invite communication to the third party AS identified by the Invite communication initiated by the user device; and
said third party AS:
communicating with said proxy agent through said Proxy 1 to initiate communication between third party AS and the user device.

9. The method of claim 8 wherein said AS initiates a media session directly with the user device responsive to the user device:
sending an acknowledgement (ACK) directly to said third party application server.

10. A user device configured to perform functions of a session initiated protocol (SIP) proxy agent, comprising:
at least one user agent and proxy agent provided in said user device and configured to incorporate an address of an SIP proxy server and an internal domain in said proxy agent;
said user agent configured to request invitation of a session;
said proxy agent configured to determine whether a request for invitation is to be handled within an operator's domain within which the apparatus is configured to communicate or outside of the operator's domain and to determine a SIP server network outside of the operator's domain.

11. The user device of claim 10 wherein said proxy agent is configured to determine the SIP server network outside of the operator's domain by being configured to identify an internet protocol (IP) address, port and transparent protocol for a proxy in the external domain by employing directory name service (DNS) lookup.

12. The user device of claim 10 wherein, for a session within the operator's domain, said proxy agent is further configured to send a request to a proxy server in a network operator's domain specified by an operator, such that internal services provided are directly obtained.

13. The user device of claim 10 wherein said proxy agent is further configured to provide an SIP uniform resource identifier (URI) to external domains in the form of a numerical IP address of an SIP terminal, thereby eliminating communication with a proxy server of the network operator's domain in such event.

14. The user device of claim 13 wherein said proxy agent is further configured to provide the SIP URI to an external domain by being configure to provide said SIP URI responsive to a call to a third party application/content server.

15. The user device of claim 10 where the operator's domain comprises a wireless network wherein the user device is configured as a wireless transmit receive unit (WTRU) for wireless communication within the wireless network of the operator's domain.

16. The user device of claim 10 where the operator's domain comprises an IEEE 802 wireless network wherein the user device is configured as a wireless transmit receive unit (WTRU) for IEEE 802 wireless communication within the wireless network of the operator's domain.

17. The user device of claim 10 where the operator's domain comprises a code division multiple access (CDMA) wireless network wherein the user device is configured as a wireless transmit receive unit (WTRU) for CDMA wireless communication within the wireless network of the operator's domain.

18. Apparatus employed by a user device in a home domain to contact a third party application server (AS) in a domain outside of the UE's home domain, comprising:
the user device comprising:
a user agent for initiating an Invite communication employing transparent SIP;
a proxy agent, said proxy agent, responsive to said Invite comprising:
a unit for identifying the Invite communication as directed to an external domain;
a unit for performing a directory name service (DNS) lookup; and a unit for communicating an Invite communication to a proxy server (Proxy 2) of the outside domain responsive to said DNS lookup to enable the Proxy 2 of the external domain to send an Invite communication to the third party AS identified by the Invite communication initiated by the user device and to thereby enable the third party AS to communicate with said proxy agent through the Proxy 2 to initiate communication between the third party AS and the user device.

19. Apparatus employed by a user device in a home domain to contact a third party application server (AS) located in the home domain, comprising:

the user device comprising:

a user agent for initiating an Invite communication employing transparent SIP;

a proxy agent, said proxy agent, responsive to said Invite communication, comprising:

a unit for identifying the Invite communication as directed to an internal domain;

a unit for performing a directory name service (DNS) lookup; and a unit for communicating an Invite communication to a proxy server (Proxy 1) of the home domain associated with the AS, responsive to said DNS lookup to enable the Proxy 1 to send an Invite communication to the third party AS identified by the Invite communication initiated by the user device and to thereby enable the third party AS to communicate with said proxy agent through the Proxy 1 to initiate communication between the AS and the user device.

* * * * *

UNITED STATES PATENT AND TRADEMARK OFFICE
CERTIFICATE OF CORRECTION

PATENT NO. : 7,574,595 B2 Page 1 of 1
APPLICATION NO. : 10/900941
DATED : August 11, 2009
INVENTOR(S) : Pragada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1411 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,574,595 B2 | |
| APPLICATION NO. | : 10/900941 | |
| DATED | : August 11, 2009 | |
| INVENTOR(S) | : Pragada et al. | |

It is certified that error appears in the above-identified patent and that said Letters Patent is hereby corrected as shown below:

ON THE TITLE PAGE

Item (57), ABSTRACT, page 1, right column, line 4, after the word "service" delete "provide" and insert therefor --provider--.

At column 1, line 7, after the word "priority" insert --to--.

At column 1, line 25, after the words "may be" delete "anyone" and insert therefor --any one--.

At column 1, line 56, after the words "in the" delete "operators" and insert therefor --operator's--.

At column 3, line 4, after the word "access" delete "to".

At column 4, line 25, before the word "communication" delete "200OK" and insert therefor --200 OK--.

At column 4, line 47, before the word "same" insert --the--.

At column 4, line 58, after the word "step" delete "S13" and insert therefor --S14--.

At column 4, line 64, before the word "communication" delete "200OK" and insert therefor --200 OK--.

At column 5, line 44, before the words "query/response" delete "DSN" and insert therefor --DNS--.

At column 8, line 12, before the word "present" insert --the--.

At column 8, line 16, after the words "However, the" delete "Erricsson" and insert therefor --Ericsson--.

Signed and Sealed this
Eleventh Day of October, 2011

David J. Kappos
*Director of the United States Patent and Trademark Office*

CERTIFICATE OF CORRECTION (continued)
U.S. Pat. No. 7,574,595 B2

At column 8, after line 44, insert paragraph
--Although the features and elements of the present invention are described in the preferred embodiments in particular combinations, each feature or element can be used alone (without the other features and elements of the preferred embodiments) or in various combinations with or without other features and elements of the present invention.--.

At claim 14, column 10, line 38, after the words "by being" delete "configure" and insert therefor --configured--.